United States Patent Office 2,833,749
Patented May 6, 1958

2,833,749

SILICON CONTAINING ADDITION PRODUCTS OF PARTIALLY HYDROGENATED RUBBERY POLYMERS

Rufus V. Jones and Peter J. Canterino, Bartlesville, Okla., assignors to Phillips Petroleum Company, a corporation of Delaware No Drawing. Application April 23, 1953
Serial No. 350,778

16 Claims. (Cl. 260—85.1)

This invention relates to rubbery materials, these materials being prepared from partially hydrogenated synthetic rubbery polymers and halosilanes or silicon tetrahalides. In a further aspect, this invention relates to novel compositions, these being the reaction products of partially hydrogenated synthetic rubbery polymers and halosilanes or silicon tetrahalides, said reaction products having been hydrolyzed or esterfied. In a further aspect, this invention relates to a method of controlling this reaction, i. e., a method by which the amount of silicon introduced into the polymer can be controlled.

Each of the following objects is obtained by at least one of the aspects of this invention.

An object of this invention is to prepare novel rubbery materials from partially hydrogenated synthetic polymers. A further object of this invention is to provide novel products by reacting halosilanes or silicon tertahalides with partially hydrogenated rubbery polymers. A further object of this invention is to provide novel materials, these being the reaction products of halosilanes or silicon tetrahalides and partially hydrogenated rubbery polymers, these reaction products being hydrolyzed or esterified. A further object of this invention is to provide a method for controlling the reaction so that no more than a predetermined amount of the halosilane or silcon tetrahalide reacts with the hydrogenated rubbery polymer. A further object of this invention is to provide the reaction product of hydrogenated polybutadiene rubber and trichlorosilane, said reaction product having been hydrolyzed with water or esterified with an aliphatic alcohol.

Other objects and advantages will be apparent to one skilled in the art upon reading this specification.

It is known that polymers of conjugated dienes, and copolymers of conjugated dienes with comonomers polymerizable therewith, can be hydrogenated to form hydrogenated rubbery polymers. While the degree of unsaturation can be varied over large limits, the hydrogenated polymers suitable for use in the present invention are those which have an unsaturation in the range from 5 to 50 percent, and preferably from 5 to 30 percent.

We have discovered that novel products can be prepared by the addition of halosilanes and partially hydrogenated rubbery polymers and copolymers. These products have increased tensile strength over the hydrogenated polymer and have lower swell characteristics when in contact with hydrocarbon solvents.

As stated above, the unsaturation of these materials should be below 50 percent. When polymers having greater unsaturation are used, larger amounts of the halosilane or silicon tetrahalide are introduced and the products are infusible resin-like materials. Using the less unsaturated materials the products are best characterized as tough rubbery materials, or even leathery materials, but they would not be considered as an infusible resin-like material. The products can be hydrolyzed or esterfied. Following such treatment they are insoluble in water and highly resistant to the action of common solvents, these properties being an improvement over the hydrogenated starting material.

The rubbery materials, which are prepared by the process of this invention are thermoplastic and as such are very useful in the production of molded articles such as oil-resistant containers, gaskets, hose, shoe soles and the like.

The products of this invention are prepared by the interaction of partially hydrogenated rubbery polymers, and partially hydrogenated copolymers of conjugated dienes with other monomers polymerizable therewith, and a halosilane or silicon tetrahalide. The halosilanes which can be employed have the formula

$$R_n SiHX_{3-n}$$

wherein R can be an alkyl group containing up to 4 carbon atoms or a phenyl group, n is 0 or 1, and X can be chlorine or bromine. Also applicable are the silicon tetrahalides, such as silicon tetrachloride and silicon tetrabromide. Substituted halosilanes applicable for use in our invention include trichlorosilane, tribromosilane, methyldichlorosilane, ethyldibromosilane, isoproplydichlorosilane, n-butyldibromosilane, phenyldichlorosilane, and the like. Mixtures of these materials can also be used.

According to this invention the partially hydrogenated rubbery polymers are reacted with the halosilane or the silicon tetrahalide at a temperature in the range of 100 to 450° F., preferably 200 to 400° F. for a period of 0.5 to 50 hours, preferably 1 to 30 hours. Suitable pressures are in the range from about 100 to about 1000 p. s. i. g. The amount of halosilane or silicon tetrahalide used can vary from 0.1 mols of halosilane or silicon tetrahalide per olefinic linkage up to an excess, such as 2 mols per olefinic linkage. We have found that the average degree of substitution varies from about 0.01 to about 0.6 considering the number of olefinic linkages. The weight percent of silicon in the resultant product varies from 0.5 to 20 percent, preferably 1 to 10 percent of the product.

The partially hydrogenated polymers are used to avoid excessive introduction of the halosilane or silicontetrahalide into the polymeric structure. Since the silicon seldom adds to all of the ethylenic linkages in the polymer, the undesired excessive reaction is eliminated by the use of polymers which have been hydrogenated to an unsaturation of 50 percent or less. However, hydrogenating to a residual unsaturation of 30 percent provides an additional measure of safety.

Following the reaction with the halosilane or silicon tetrahalide, the products can be treated with water to hydrolyze the reactive silane groups, or they can be treated with alcohols or alkoxysilanes to esterify the silane groups. Suitable are alkoxysilanes of the formula

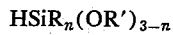
$$HSiR_n(OR')_{3-n}$$

in which R represents an alkyl radical containing up to 4 carbon atoms or a phenyl radical, R' is an alkyl radical, such as methyl, ethyl, or proply and n is 0 or 1.

The mechanism of this hydrolysis or esterification is not thoroughly understood. However, it appears that this treatment removes halogen atoms as HX and the products become cross linked. The resultant materials become harder and higher melting.

The hydrogenated polymers which are useful in the practice of this invention are those prepared by polymerization of aliphatic conjugated dienes or a mixture of such a diene with lesser amounts of other compounds containing an active vinylidene group which are copolymerizable therewith. These copolymerizable monomers include aryl olefins such as styrene, alkyl-substituted styrene, acrylic and substituted acrylic acids, esters and the like, acrylonitrile, methacrylonitrile and the like. Hydrogenation of these polymers can be carried out by any suitable method. A preferred method is that described in copending application of Jones and Moberly, filed December 26, 1950, Serial No. 202,797, now abandoned, in which these rubbery polymers are hydrogenated employing a catalyst such as finely divided nickel on kieselguhr at elevated temperatures and pressures.

In some instances it is desirable to employ catalysts to bring about the reaction of the present invention. Suitable catalysts include ultra violet light and organic peroxides and hydroperoxides such as benzoyl peroxide, acetyl peroxide, diisopropylbenzene hydroperoxide, [di-methyl(isopropylphenyl)hydroperoxymethane], tert - butyl- isopropylbenzene hydroperoxide, [di-methyl(tert-butylphenyl)hydroperoxymethane], and the like. When employing said organic peroxides and hydroperoxides as catalysts, the amount used will be in the range from 0.5 to 10 percent of the weight of the rubbery polymer or copolymer being treated.

The interaction of hydrogenated rubbery polymers and copolymers of conjugated diolefins with halosilanes or silicon tetrahalides according to the present invention can be effected with the starting material dissolved or dispersed in a suitable inert solvent or by immersing the starting material in a liquid halosilane or silicon tetrahalide in the absence of a solvent. When operating with the starting material in solution or dispersion,[1] suitable solvents include cyclohexane and methylcyclohexane, chlorinated materials such as carbon tetrachloride, chloroform and the like, aromatic hydrocarbons such as benzene, ethylbenzene, toluene, xylene and the like. Materials such as saturated aliphatic hydrocarbons which do not dissolve but do swell the polymeric starting material can also be employed.

Example I

A run was made wherein 250 grams of polybutadiene rubber (48 ML₄) prepared in an emulsion polymerization recipe at 41° F. was dissolved in 2.5 liters methylcyclohexane and charged to a hydrogenator. The rubber solution was washed from its container with two 500 ml. portions of methylcyclohexane. Nickel on kieselguhr catalyst[2] was then added and hydrogenation was effected at 400° F. and 500 p. s. i. g. for 6 hours. After hydrogenation the catalyst was removed by magnetic separation and the product was drum dried. The product had an unsaturation value of 16.7 percent.[3]

A run was made wherein 20 grams of hydrogenated polybutadiene rubber from the hydrogenation run described above was dissolved in 50 cc. of benzene and added to a pressure reactor along with 10 grams of trichlorosilane (HSiCl₃). The mixture was held for 20 hours at a temperature of 392° F. The pressure developed by the mixture was 200 p. s. i. g. At the end of the run the reactor was cooled to room temperature, opened, and heated to 212° F. to remove unreacted trichlorosilane. The reaction mixture was then poured into isopropyl alcohol and stirred vigorously. The ester product so formed was washed with water and dried in vacuo at 122° F. for 12 hours. The yield was 22 grams of product having a chlorine analysis of 0.6 weight percent and a silicon content of 2.3 weight percent. The product was a tough, nervy, rubbery material which did not mold at 375° F. and 2500 p. s. i. g. It did not melt on a hot plate at 500 to 600° F. and was insoluble in benzene and toluene.

Example II

A run was made wherein 250 grams of polybutadiene rubber (47 ML₄) prepared in an emulsion polymerization recipe at 41° F. was dissolved in 2.5 liters of methylcyclohexane and charged to a hydrogenator. The rubber solution was washed from its container with two 500 ml. portions of methylcyclohexane. Nickel-on-kieselguhr catalyst[4] was then added and hydrogenation was effected at 350° F. and 500 p. s. i. g. for 3.75 hours. Unsaturation of the product was 24.3 percent.

3.3 grams of hydrogenated polybutadiene rubber from the hydrogenation run described above was molded into a disc 2.125" in diameter by 0.060" thick at 250° F. and 2000 p. s. i. g. The pellet and 6 grams of trichlorosilane were placed in a pressure reactor and heated to 100° C. for 48 hours. At the end of the reaction period the pellet had lost its shape. The product was removed and placed in an open desiccator containing calcium chloride to allow unreacted trichlorosilane to escape. It was then remolded at 300° F. and 2500 p. s. i. g., placed in water for 12 hours to hydrolyze the trichlorosilane groups and cross-link the product and was then dried. The product was a light gray, translucent, tough leathery material which was insoluble in benzene and water and had a chlorine content of 0.7 weight percent. It weighed 3.45 grams, representing a 13 percent increase in weight over the starting material. The percent swell[5] of the product was 97.5 percent whereas the percent swell of the hydrogenated polymer was 121.

As many possible embodiments may be made of this invention without departing from the scope thereof, it is to be understood that all matter herein set forth is to be interpreted as illustrative and not in a limiting sense.

We claim:

1. As new compositions of matter, the addition product of a compound selected from the group consisting of halosilanes and silicon tetrahalides, and partially hydrogenated compounds selected from the group consisting of polymers of conjugated dienes and copolymers of conjugated dienes and monomers copolymerizable therewith, the residual unsaturation of said polymer being not greater than 50 percent.

2. As new compositions of matter, the addition product of halosilanes and partially hydrogenated compounds selected from the group consisting of polymers of conjugated dienes and copolymers of conjugated dienes and monomers copolymerizable therewith, the residual unsaturation of said polymer being not greater than 50 percent.

3. The composition of claim 2 in which the halosilanes have the formula

$$R_nSiHX_{3-n}$$

wherein R is selected from the group consisting of alkyl and phenyl groups, n is selected from the group consisting of 0 and 1, and X is selected from the group consisting of chlorine and bromine.

4. As new compositions of matter, the addition product of chlorosilanes and partially hydrogenated compounds selected from the group consisting of polymers of conjugated dienes and copolymers of conjugated dienes and monomers copolymerizable therewith, the residual unsaturation of said polymer being not greater than 50 percent.

5. The product produced by reacting bromosilane with a partially hydrogenated rubbery synthetic rubber selected

---

[1] Hydrogenated rubbery polymers and copolymers of conjugated diolefins often form dispersions rather than solutions in the solvents disclosed.

[2] Total catalyst for the run was prepared by reducing 125 grams of commercial nickel hydroxide on kieselguhr catalyst in a hydrogen atmosphere and subsequently quenching with 1.5 liters of methylcyclohexane. The catalyst composition (i. e., exclusive of solvent) contained approximately 75 weight percent of nickel on a completely reduced basis.

[3] Unsaturation was determined by the method of Lee, T. S., Kolthoff, I. M., Mairs, M. A., "Determination of Unsaturation of Synthetic and Natural Rubber," J. Poly. Sci. 3, 6684 (1948).

[4] Total catalyst for the run was prepared by reducing 180 grams of commercial nickel hydroxide on kieselguhr catalyst in a hydrogen atmosphere and subsequently quenching with 1.5 liters of methylcyclohexane. The catalyst composition (i. e., exclusive of solvent) contained approximately 75 weight percent of nickel on a completely reduced basis.

[5] Swell was measured in a 70/30 isooctane-toluene mixture at room temperature on a portion of the molded disc, which was 2" x 1" x 0.060". The sample was immersed for 3 days and the swell was then determined.

$$\frac{V_2-V_1}{V_1} \times 100 = \text{percent swell} \ (V_1 = \text{initial volume}, V_2 = \text{swelled volume}).$$

from polymers of conjugated dienes and copolymers of conjugated dienes and monomers copolymerizable therewith, the residual unsaturation of said polymer being not greater than 50 percent, and treating the reaction product with a compound selected from the group consisting of water, aliphatic alcohols containing not over 4 carbon atoms per molecule, and alkoxy silanes.

6. The product of claim 5 in which the reaction with water is carried out by exposing the halosilane-polymeric reaction product to moist air.

7. The product produced by reacting a partially hydrogenated diene polymer having residual unsaturation of not over 50 percent and halosilane having the formula $$R_nSiHX_{3-n}$$

wherein R is selected from the group consisting of alkyl groups containing not over 4 carbon atoms and phenyl groups, $n$ is an integer selected from the group consisting of 0 and 1, and X is selected from the group consisting of chlorine and bromine, at a temperature of 100 to 450° F. for 0.5 to 50 hours at a pressure of 100 to 1000 p. s. i. g., and treating the reaction product with a compound selected from the group consisting of water, alkoxysilanes and aliphatic alcohols containing not over 4 carbon atoms per molecule.

8. The product of claim 7 in which the reaction between the halosilane and the partially hydrogenated polymer is carried out in the presence of a catalyst selected from the group consisting of organic peroxides and organic hydroperoxides.

9. The product of claim 7 in which the reaction between the halosilane and the partially hydrogenated polymer is carried out in the presence of ultraviolet light.

10. The product of claim 7 in which the halosilane is trichlorosilane.

11. The product of claim 7 in which the silicon content is between the limits of 0.5 to 20 percent by weight of the total product.

12. The product of claim 7 in which the silicon content is between 1 and 10 percent by weight of the total product.

13. The product produced by reaction chlorosilane with partially hydrogenated polybutadiene having a residual unsaturation not exceeding 30 percent and treating the reaction product with water.

14. The product produced by reacting chlorosilane with a partially hydrogenated rubbery synthetic rubber selected from polymers of conjugated dienes and copolymers of conjugated dienes with monomers copolymerizable therewith, the residual unsaturation being not greater than 50 percent, and treating the reaction product with a compound selected from the group consisting of water, aliphatic alcohols containing not over 4 carbon atoms per molecule and alkoxysilanes.

15. The product produced by reacting chlorosilane with partially hydrogenated polybutadiene having a residual unsaturation not exceeding 30 percent and treating the reaction product with isopropyl alcohol.

16. A moldable plastic prepared by hydrogenating a rubbery polymer selected from the group consisting of polymers of conjugated dienes and polymers of conjugated dienes with monomers copolymerizable therewith to a residual unsaturation of not more than 50 percent of the original unsaturation of said polymer, and reacting said hydrogenated polymer with a compound selected from the group consisting of halosilanes and silicon tetrahalides.

References Cited in the file of this patent

UNITED STATES PATENTS

| | | |
|---|---|---|
| 2,475,122 | Barry et al. | July 5, 1949 |
| 2,561,177 | Barry | July 17, 1951 |